United States Patent [19]

Meyer

[11] Patent Number: 4,936,961
[45] Date of Patent: Jun. 26, 1990

[54] METHOD FOR THE PRODUCTION OF A FUEL GAS

[76] Inventor: Stanley A. Meyer, 3792 Broadway, Grove City, Ohio 43123

[21] Appl. No.: 207,730

[22] Filed: Jun. 16, 1988

Related U.S. Application Data

[63] Continuation-in-part of Ser. No. 81,859, Aug. 5, 1987, Pat. No. 4,826,581.

[51] Int. Cl.$^5$ .............................................. C07G 13/00
[52] U.S. Cl. ............................ 204/157.5; 204/157.52
[58] Field of Search ............... 204/157.5, 157.52, 183.1

[56] References Cited

U.S. PATENT DOCUMENTS 3,740,283  4/1988  Laas et al. .................... 204/183.1 X
4,511,450  4/1985  Neefe ........................... 204/152.5 X
4,696,809  9/1987  Vialoron et al. ........... 204/157.52 X

OTHER PUBLICATIONS

Julius Grant, ed., *Hachh's Chemical Dictionary*, 4th ed., McGraw-Hill Book Co., 1969, p. 282.

Primary Examiner—Stephen J. Kalafut
Attorney, Agent, or Firm—Porter, Wright, Morris & Arthur

[57] ABSTRACT

A method for obtaining the release of a fuel gas mixture including hydrogen and oxygen from water in which the water is processed as a dielectric medium in an electrical resonant circuit.

2 Claims, 3 Drawing Sheets

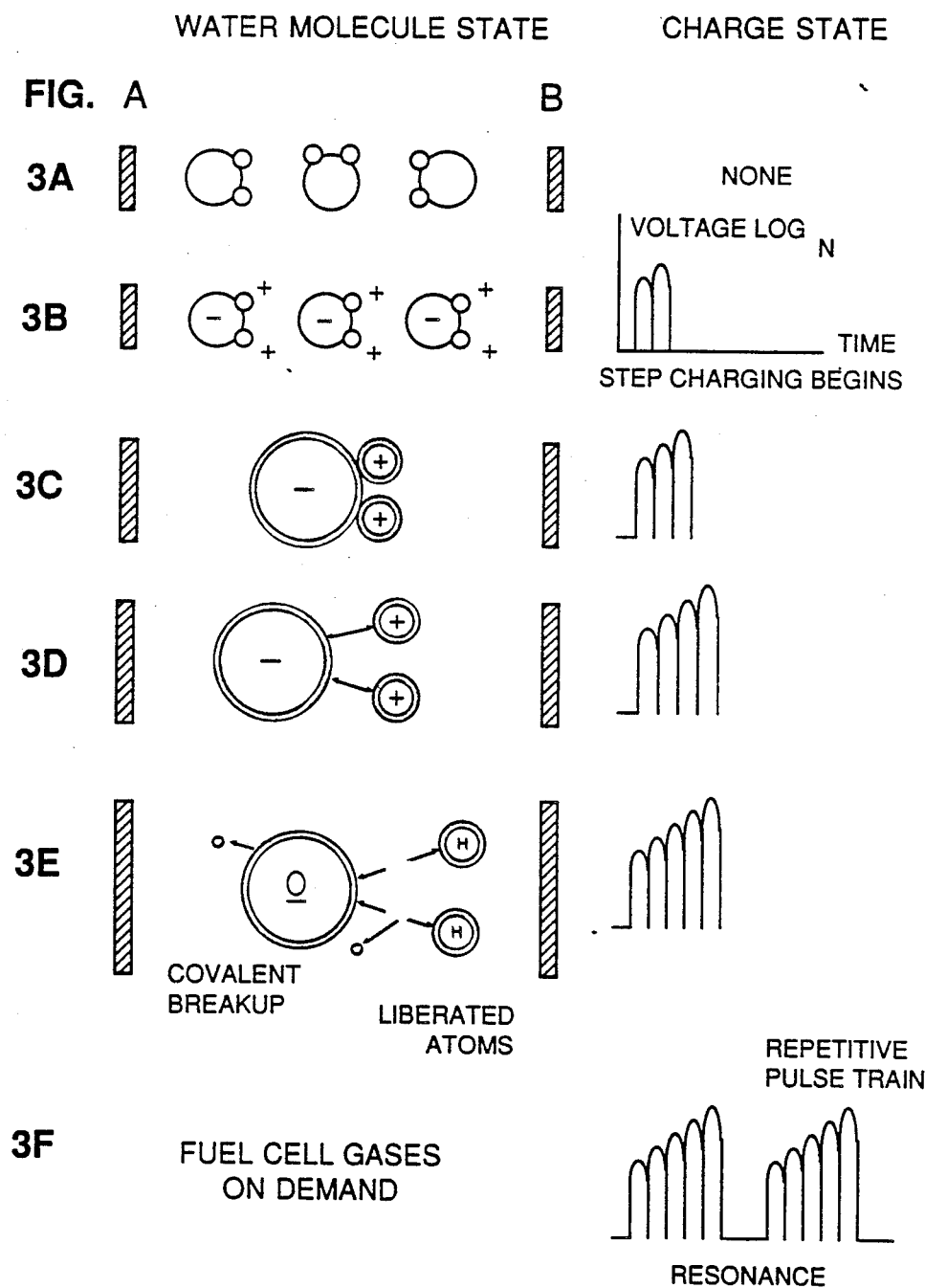

METHOD FOR THE PRODUCTION OF A FUEL GAS

Related Application

This is a continuation-in-part of my co-pending application Ser. No. 081,859, filed 8/5/87, now U.S. Pat. No. 4,826,581.

Field of Invention

This invention relates to a method of and apparatus for obtaining the release of a fuel gas mixture including hydrogen and oxygen from water.

BACKGROUND OF THE PRIOR ART

Numerous processes have been proposed for separating a water molecule into its elemental hydrogen and oxygen components. Electrolysis is one such process. Other processes are described in United States patents such as 4,344,831; 4,184,931; 4,023,545; 3,980,053; and Patent Cooperation Treaty application No. PCT/US80/1362, published 30 April, 1981.

OBJECTS OF THE INVENTION

It is an object of the invention to provide a fuel cell and a process in which molecules of water are broken down into hydrogen and oxygen gases, and a fuel gas mixture including hydrogen, oxygen and other gasses formerly dissolved within the water is produced. As used herein the term "fuel cell" refers to a single unit of the invention comprising a water capacitor cell, as hereinafter explained, that produces the fuel gas in accordance with the method of the invention. Brief Description of the Drawings FIG. 1 illustrates a circuit useful in the process.

FIGS. 3A through 3F are illustrations depicting the theoretical bases for phenomena encountered during operation of the invention herein.

Description of the Preferred Embodiment

Figure 2:
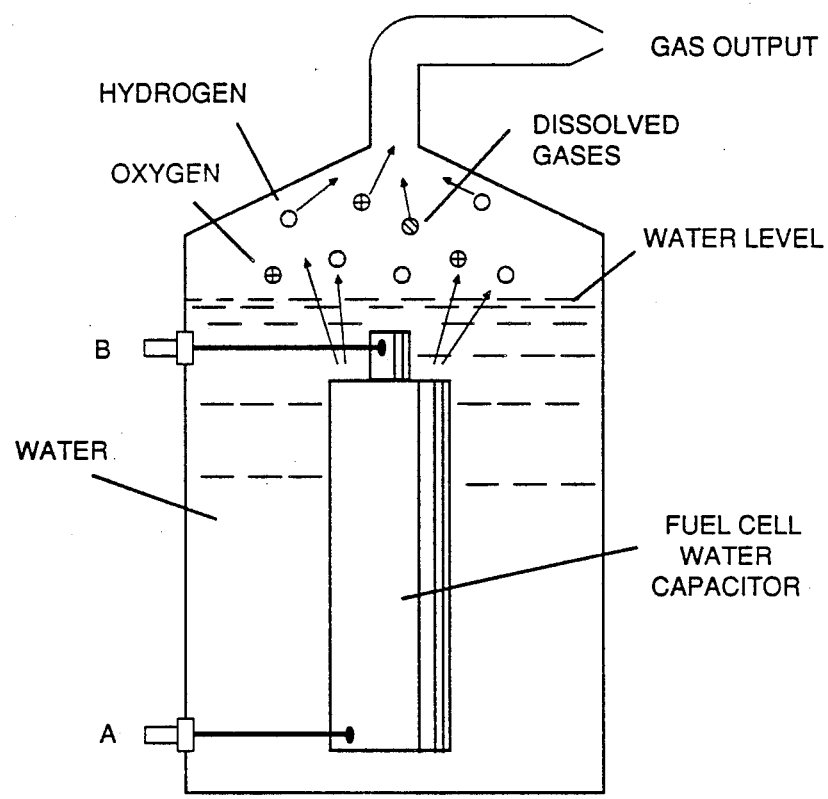
FIG. 2 shows a perspective of a "water capacitor"-'element used in the fuel cell circuit.

In brief, the invention is a method of obtaining the release of a gas mixture including hydrogen and oxygen and other dissolved gases formerly entrapped in water, from water consisting of: (A) providing a capacitor, in which the water is included as a dielectric liquid between capacitor plates, in a resonant charging choke circuit that includes an inductance in series with the capacitor; (B) subjecting the capacitor to a pulsating, unipolar electric voltage field in which the polarity does not pass beyond an arbitrary ground, whereby the water molecules within the capacitor are subjected to a charge of the same polarity and the water molecules are distended by their subjection to electrical polar forces; (C) further subjecting the water in said capacitor to said pulsating electric field to achieve a pulse frequency such that the Pulsating electric field induces a resonance within the water molecule; (D) continuing the application of the pulsing frequency to the capacitor cell after resonance occurs so that the energy level within the molecule is increased in cascading incremental steps in proportion to the number of pulses; (E) maintaining the charge of said capacitor during the application of the pulsing field, whereby the co-valent electrical bonding of the hydrogen and oxygen atoms within said molecules is destabilized such that the force of the electrical field applied, as the force is effective within the molecule, exceeds the bonding force of the molecule, and hydrogen and oxygen atoms are liberated from the molecule as elemental gases; and (F) collecting said hydrogen and oxygen gases, and any other gases that were formerly dissolved within the water, and discharging the collected gases as a fuel gas mixture.

The process follows the sequence of steps shown in the following Table I in which water molecules are subjected to increasing electrical forces. In an ambient state, randomly oriented water molecules are aligned with respect to a molecular polar orientation. They are next, themselves polarized and "elongated" by the application of an electric Potential to the extent that covalent bonding of the water molecule is so weakened that the atoms disassociate and the molecule breaks down into hydrogen and oxygen elemental components. Engineering design parameters based on known theoretical principles of electrical circuits determine the incremental levels of electrical and wave energy input required to produce resonance in the system whereby the fuel gas comprised of a mixture of hydrogen, oxygen, and the other gases such as air test were formerly dissolved within the water, is produced.

TABLE I
PROCESS STEPS
THE SEQUENCE OF THE RELATIVE STATE
OF THE WATER MOLECULE AND/OR
HYDROGEN/OXYGEN/OTHER ATOMS:

| | |
|---|---|
| A. | (AMBIENT STATE) RANDOM |
| B. | ALIGNMENT OF POLAR FIELDS |
| C. | POLARIZATION OF MOLECULE |
| D. | MOLECULAR ELONGATION |
| E. | ATOM LIBERATION BY BREAKDOWN OF COVALENT BOND |
| F. | RELEASE OF GASES |

In the process, the point of optimum gas release is reached at a circuit resonance. Water in the fuel cell is subjected to a pulsating, polar electric field produced by the electrical circuit whereby the water molecules are distended by reason of their subjection to electrical polar forces of the capacitor plates. The polar pulsating frequency applied is such that the pulsating electric field induces a resonance in the molecule. A cascade effect occurs and the overall energy level of specific water molecules is increased in cascading, incremental steps. The hydrogen and oxygen atomic gases, and other gas components formerly entrapped as dissolved gases in water, are released when the resonant energy exceeds the co-valent bonding force of the water molecule. A preferred construction material for the capacitor plates is a stainless steel T-304 which is non-chemically reactive with water, hydrogen, or oxygen. An electrically conductive material which is inert in the fluid environment is a desirable material of construction for the electrical field plates of the "water capacitor" employed in the circuit.

Once triggered, the gas output is controllable by the attenuation of operational parameters. Thus, once the frequency of resonance is identified, by varying the applied pulse voltage to the water fuel cell assembly, gas output is varied. By varying the pulse shape and/or amplitude or pulse train sequence of the initial pulsing wave source, final gas output is varied. Attenuation of the voltage field frequency in the form of OFF and ON pulses likewise affects output.

The overall apparatus thus includes an electrical circuit in which a water capacitor having a known dielectric property is an element. The fuel gases are obtained from the water by the disassociation of the water molecule. The water molecules are split into component atomic elements (hydrogen and oxygen gases) by a voltage stimulation process called the electrical polarization process which also releases dissolved gases entrapped in the water.

From the outline of physical phenomena associated with the process described in Table 1, the theoretical basis of the invention considers the respective states of molecules and gases and ions derived from liquid water. Before voltage stimulation, water molecules are randomly dispersed throughout water within a container. When a unipolar voltage pulse train such as shown in FIGS. 3B through 3F is applied to positive and negative capacitor plates, an increasing voltage potential is induced in the molecules in a linear, step-like charging effect. The electrical field of the particles within a volume of water including the electrical field plates increases from a low energy state to a high energy state successively in a step manner following each pulse-train as illustrated figuratively in the depictions of FIG. 3A through 3F. The increasing voltage potential is always positive in direct relationship to negative ground potential during each pulse. The voltage polarity on the plates which create the voltage fields remains constant although the voltage charge increases. Positive and negative voltage "zones" are thus formed simultaneously in the electrical field of the capacitor plates.

In the first stage of the process described in Table 1, because the water molecule naturally exhibits opposite electrical fields in a relatively polar configuration (the two hydrogen atoms are positively electrically charged relative to the negative electrically charged oxygen atom), the voltage pulse causes initially randomly oriented water molecules in the liquid state to spin and orient themselves with reference to positive and negative poles of the voltage fields applied. The positive electrically charged hydrogen atoms of said water molecule are attracted to a negative voltage field; while, at the same time, the negative electrically charged oxygen atoms of the same water molecule are attracted to a positive voltage field. Even a slight potential difference applied to inert, conductive plates of a containment chamber which forms a capacitor will initiate polar atomic orientation within the water molecule based on polarity differences.

When the potential difference applied causes the orientated water molecules to align themselves between the conductive plates, pulsing causes the voltage field intensity to be increased in accordance with FIG. 3B. As further molecular alignment occurs, molecular movement is hindered. Because the positively charged hydrogen atoms of said aligned molecules are attracted in a direction opposite to the negatively charged oxygen atoms, a polar charge alignment or distribution occurs within the molecules between said voltage zones, as shown in FIG. 3B. And as the energy level of the atoms subjected to resonant pulsing increases, the stationary water molecules become elongated as shown in FIGS. 3C and 3D. Electrically charged nuclei and electrons are attracted toward opposite electrically charged voltage zones —disrupting the mass and charge equilibrium of the water molecule.

As the water molecule is further exposed to an increasing potential difference resulting from the step charging of the capacitor, the electrical force of attraction of the atoms within the molecule to the capacitor plates of the chamber also increases in strength. As a result, the co-valent bonding between atoms which form the molecule is weakened —and ultimately terminated. The negatively charged electron is attracted toward the positively charged hydrogen atoms, while at the same time, the negatively charged oxygen atoms repel electrons.

In a more specific explanation of the "sub-atomic" action that occurs in the water fuel cell, it is known that natural water is a liquid which has a dielectric constant of 78.54 at 20° C. and 1 atm pressure. [*Handbook of Chemistry and Physics*, 68th ed., CRC Press (Boca Raton, Florida (1987–88)), Section E-50. $H_2O$ (water)].

When a volume of water is isolated and electrically conductive plates, that are chemically inert in water and are separated by a distance, are immersed in the water, a capacitor is formed, having a capacitance determined by the surface area of the plates, the distance of their separation and the dielectric constant of water.

When water molecules are exposed to voltage at a restricted current, water takes on an electrical charge. By the laws of electrical attraction, molecules align according to positive and negative polarity fields of the molecule and the alignment field. The plates of a capacitor constitute such an alignment field when a voltage is applied.

When a charge is applied to a capacitor, the electrical charge of the capacitor equals the applied voltage charge; in a water capacitor, the dielectric property of water resists the flow of amps in the circuit, and the water molecule itself, because it has polarity fields formed by the relationship of hydrogen and oxygen in the covalent bond, and an intrinsic dielectric property, becomes part of the electrical circuit, analogous to a "microcapacitor" within the capacitor defined by the plates.

Figure 1:
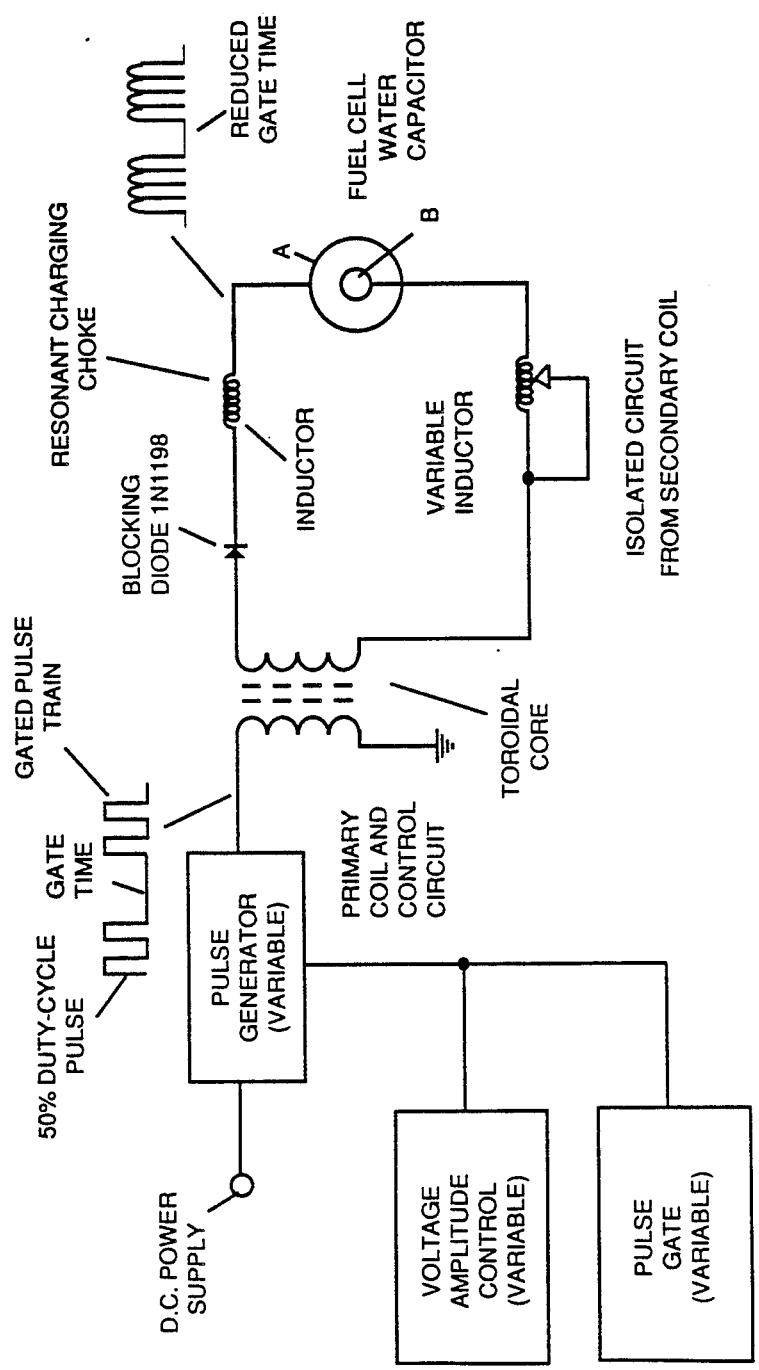

In the Example of a fuel cell circuit of FIG. 1, a water capacitor is included. The step-up coil is formed on a conventional torroidal core formed of a compressed ferromagnetic powdered material that will not itself become permanently magnetized, such as the trademarked "Ferramic 06#" "Permag" powder as described in *Siemens Ferrites Catalog*,CG-2000-002-121, (Cleveland, Ohio) No. F626-1205. The core is 1.50 inch in diameter and 0.25 inch in thickness. A primary coil of 200 turns of 24 gauge copper wire is provided and a coil of 600 turns of 36 gauge wire comprises the secondary winding.

In the circuit of FIG. 1, the diode is a 1N1198 diode which acts as a blocking diode and an electric switch that allows voltage flow in one direction only. Thus, the capacitor is never subjected to a pulse of reverse polarity.

The primary coil of the torroid is subject to a 50% duty cycle pulse. The torroidal pulsing coil provides a voltage step-up from the pulse generator in excess of five times, although the relative amount of step-up is determined by pre-selected criteria for a particular application. As the stepped-up pulse enters first inductor (formed from 100 turns of 24 gauge wire 1 inch in diameter), an electromagnetic field is formed around the inductor, voltage is switched off when the pulse ends, and the field collapses and produces another pulse of the same polarity; i.e., another positive pulse is formed where the 50% duty cycle was terminated. Thus, a double pulse frequency is produced; however, in a pulse train of unipolar pulses, there is a brief time when pulses are not present.

By being so subjected to electrical pulses in the circuit of FIG. 1, water confined in the volume that includes the capacitor plates takes on an electrical charge that is increased by a step charging phenomenon occurring in the water capacitor. Voltage continually increases (to about 1000 volts and more) and the water molecule starts to elongate.

The pulse train is then switched off; the voltage across the water capacitor drops to the amount of charge that the water molecules have taken on, i.e. voltage is maintained across the charged capacitor. The pulse train is then reapplied.

Because a voltage potential applied to a capacitor can perform work, the higher the voltage potential, the more work is performed by a given capacitor. In an optimum capacitor that is wholly non-conductive, zero (0) current flow will occur across the capacitor. Thus, in view of an idealized capacitor circuit, the object of the water capacitor circuit is to prevent electron flow through the circuit, i.e. such as occurs by electron flow or leakage through a resistive element that produces heat. Electrical leakage in water will occur, however, because of some residual conductivity and impurities or ions that may be otherwise present in the water. Thus, the water capacitor is preferably chemically inert. An electrolyte is not added to the water.

In the isolated water bath, the water molecule takes on charge, and the charge increases. The object of the process is to switch off the co-valent bonding of the water molecule and interrupt the sub-atomic force, i.e. the electrical force or electromagnetic force, that binds the hydrogen and oxygen atoms to form a molecule so that the hydrogen and oxygen separate.

Because an electron will only occupy a certain electron shell (the shells are well known) the voltage applied to the capacitor affects the electrical forces inherent in the co-valent bond. As a result of the charge applied by the plates, the applied force becomes greater than the force of the co-valent bonds between the atom of the water molecule; and the water molecule becomes elongated. When this happens, the time share ratio of the electrons between the atoms and the electron shells is modified.

In the process, electrons are extracted from the water bath; electrons are not consumed nor are electrons introduced into the water bath by the circuit as electrons are conventionally introduced in an electrolysis process. There may nevertheless occur a leakage current through the water. Those hydrogen atoms missing electrons become neutralized; and atoms are liberated from the water. The charged atoms and electrons are attracted to opposite polarity voltage zones created between the capacitor plates. The electrons formerly shared by atoms in the water co-valent bond are reallocated such that neutral elemental gases are liberated.

In the process, the electrical resonance may be reached at all levels of voltage potential. The overall circuit is characterized as a "resonant charging choke" circuit which is an inductor in series with a capacitor that produces a resonant circuit. [*SAMS Modern Dictionary of Electronics*, Rudolff Garff, © 1984, Howard W. Sams & Co. (Indianapolis, Ind.), page 859.]Such a resonant charging choke is on each side of the capacitor. In the circuit, the diode acts as a switch that allows the magnetic field produced in the inductor to collapse, thereby doubling the pulse frequency and preventing the capacitor from discharging. In this manner a continuous voltage is produced across the capacitor plates in the water bath; and the capacitor does not discharge. The water molecules are thus subjected to a continuously charged field until the breakdown of the co-valent bond occurs.

As noted initially, the capacitance depends on the dielectric properties of the water and the size and separation of the conductive elements forming the water capacitor.

EXAMPLE I

In an example of the circuit of FIG. 1 (in which other circuit element specifications are provided above), two concentric cylinders 4 inches long formed the water capacitor of the fuel cell in the volume of water. The outside cylinder was 0.75 inch in outside diameter; the inner cylinder was 0.5 inch in outside diameter. Spacing from the outside of the inner cylinder to the inner surface of the outside cylinder was 0.0625 inch. Resonance in the circuit was achieved at a 26 volt applied pulse to the primary coil of the torroid at $0KH_z$, and the water molecules disassociated into elemental hydrogen and oxygen and the gas released from the fuel cell comprised a mixture of hydrogen, oxygen from the water molecule, and gases formerly dissolved in the water such as the atmospheric gases or oxygen, nitrogen, and argon.

In achieving resonance in any circuit, as the pulse frequency is adjusted, the flow of amps is minimized and voltage is maximized to a peak. Calculation of the resonance frequency of an overall circuit is determined by known means; different cavities have a different frequencY of resonance dependent on parameters of the water dielectric, plate size, configuration and distance, circuit inductors, and the like. Control of the production of fuel gas is determined by variation of the period of time between a train of pulses, pulse amplitude and capacitor plate size and configuration, with corresponding value adjustments to other circuit components.

The wiper arm on the second inductor tunes the circuit and accommodates to contaminants in water so that the charge is always applied to the capacitor. The voltage applied determines the rate of breakdown of the molecule into its atomic components. As water in the cell is consumed, it is replaced by any appropriate means or control system.

Variations of the process and apparatus may be evident to those skilled in the art.

What is claimed is:

1. A method of obtaining the release of a gas mixture including hydrogen and oxygen and other dissolved gases formerly entrapped in water, from water, consisting of:

(A) providing a capacitor in which water is included as a dielectric between capacitor plates, in a resonant charging choke circuit that includes an inductance in series with the capacitor;

(B) subjecting the capacitor to a pulsating, unipolar electric charging voltage in which the polarity does not pass beyond an arbitrary ground, whereby the water molecules within the capacitor are subjected to the electric field between the capacitor plates;

(C) further subjecting the water in said capacitor to a pulsating electric field resulting from the subjection of the capacitor to the charging voltage such that the pulsating electric field induces a resonance within the water molecules;

(D) continuing the application of the pulsating charging voltage to the capacitor after resonance occurs so that the energy level within the molecules is increased in cascading incremental steps in proportion to the number of pulses;

(E) maintaining the charge of said capacitor during the application of the pulsating charging voltage, whereby the co-valent electrical bonding of the hydrogen and oxygen atoms within said molecules is destabilized, such that the force of the electrical field applied to the molecules exceeds the bonding force within the molecules, and hydrogen and oxygen atoms are liberated from the molecules as elemental gases.

2. The method of claim 1 including the further steps of collecting said liberated hydrogen and oxygen gases, and any other gases that were formerly dissolved within the water and discharging said collected gases as a fuel gas mixture.

* * * * *